United States Patent
Ratnakar et al.

(10) Patent No.: US 7,391,910 B2
(45) Date of Patent: Jun. 24, 2008

(54) LAPE: LAYERED PRESENTATION SYSTEM UTILIZING COMPRESSED-DOMAIN IMAGE PROCESSING

(75) Inventors: Viresh Ratnakar, Sunnyvale, CA (US); Vasudev Bhaskaran, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 1275 days.

(21) Appl. No.: 10/631,072

(22) Filed: Jul. 31, 2003

(65) Prior Publication Data

US 2005/0024387 A1    Feb. 3, 2005

(51) Int. Cl.
G06K 9/36      (2006.01)
G09G 5/00      (2006.01)
G06K 9/46      (2006.01)

(52) U.S. Cl. ........................................ 382/232; 345/629
(58) Field of Classification Search ................ 382/173, 382/214, 232, 233, 254, 276, 284, 305; 345/512, 345/541, 567, 600–604, 629; 358/450; 700/17, 700/83; 709/203; 717/116, 136
See application file for complete search history.

(56) References Cited

U.S. PATENT DOCUMENTS

| | | | |
|---|---|---|---|
| 5,818,425 A | 10/1998 | Want et al. | |
| 5,872,923 A | 2/1999 | Schwartz et al. | |
| 5,991,276 A | 11/1999 | Yamamoto | |
| 6,272,251 B1 | 8/2001 | de Queiroz et al. | |
| 6,292,204 B1 | 9/2001 | Carleton et al. | |
| 6,298,166 B1 | 10/2001 | Ratnakar et al. | |
| 6,356,275 B1 * | 3/2002 | Ansberry et al. | ............. 345/600 |
| 6,370,280 B1 * | 4/2002 | Cok et al. | .................. 382/284 |
| 6,411,988 B1 | 6/2002 | Tafoya et al. | |
| 6,437,818 B1 | 8/2002 | Ludwig et al. | |
| 6,895,126 B2 * | 5/2005 | Di Bernardo et al. | ....... 382/284 |
| 7,050,654 B2 * | 5/2006 | Lunetta et al. | .............. 382/284 |
| 7,095,905 B1 * | 8/2006 | Peterson | ..................... 382/284 |
| 7,127,124 B2 * | 10/2006 | Tanaka | ........................ 382/284 |
| 2005/0024387 A1 * | 2/2005 | Ratnakar et al. | ............ 345/629 |

FOREIGN PATENT DOCUMENTS

EP    1 241 591    9/2002

OTHER PUBLICATIONS

"WebPresent—A World Wide Web based tele-presentation tool for physicians", S. Sampath-Kumar, et al., Proceedings of the SPIE, SPIE vol. 3031, Feb. 23, 1997, pp. 490-499.
"A Multimedia Presentation Toolkit for the World Wide Web", J. Wong, et al., Software Practice & Experience, vol. 27, No. 4, Apr. 1997, pp. 425-446.

* cited by examiner

*Primary Examiner*—Amir Alavi

(57) ABSTRACT

A layered presentation system (LAPE) includes a server that performs compressed-domain image processing on image data received from multiple clients including a master client and other clients to generate a composite image that incorporates imagery from the other clients with a master image from the master client for viewing on a shared display. The system's clients can add imagery in the form of questions, comments, and graphics to a currently displayed image. The added imagery is processed along with the master image to generate the composite image that then appears on the shared display and perhaps also on each client's individual display. The processing includes scaling the master image/added imagery, as required, and blending and/or overlaying the added imagery onto the master image so as to augment but not obscure it. A network protocol is included for sending image data in the compressed domain back and forth between the server and each of the clients.

25 Claims, 6 Drawing Sheets

LAPE: LAYERED PRESENTATION SYSTEM UTILIZING COMPRESSED-DOMAIN IMAGE PROCESSING

BACKGROUND OF THE INVENTION

1. Field of the Invention

The present invention relates to a presentation system for processing image data received from multiple clients including a master client and other clients to generate a composite image/frame that incorporates the imagery from the other clients with a master image from the master client for viewing on a shared display, such as an LCD projector or shared electronic whiteboard. An underlying image processing algorithm processes the additional imagery, which may be in the form of questions, comments, graphics, etc., along with the master image to generate the composite image that then appears on the shared display and perhaps also on each client's individual display. The system, and its algorithm, can be implemented in a variety of different ways, utilizing hardware, software, and/or networking resources.

2. Description of the Related Art

Business meetings/presentations with multiple attendees are quite common today. Typically, such meetings/presentations take place in a conference room where a lead presenter and one or more of the other attendees are gathered. Additional attendees may be remotely located but able to participate via telecommunication. The lead presenter may be making a presentation using an LCD projector that displays on screen images/slides created using PowerPoint® or any other presentation software. Other participants may occasionally have comments or questions concerning a particular slide. While some such comments/questions can be asked orally, it may be easier for a particular participant or more useful for the group as a whole, for that participant to augment his comment/question by adding imagery/annotations/video to the current displayed contents so that others can see.

The presentation system should be able to efficiently receive and process such secondary image data from multiple clients, some of which may be remotely located. Such a system should also be able to handle data exchange between a main server and a variety of clients having different configurations, including personal PCs, laptops, wireless handheld devices such as cell phones and PDAs, and to give any client the option to view a copy of the current screen contents on its own display of whatever size. In addition, such secondary image data needs to be merged so as to effectively augment the main image.

OBJECTS AND SUMMARY OF THE INVENTION

Objects of the Invention

It is therefore an object of the present invention to provide a presentation system that meets all of these needs and does so by utilizing efficient compressed-domain operations on JPEG images.

It is another object of this invention to provide a compressed-domain image processing algorithm for a presentation system that offers various processing options, such as scaling secondary image data for desired placement, and blending this extra imagery on to the existing screen.

It is a further object of this invention to provide a presentation system and image processing algorithm that supports clients of a variety of different configurations and connection modes and provides full functionality to each of the clients (i.e., the ability to view current screen contents and add secondary imagery to a master image as desired).

SUMMARY OF THE INVENTION

According to one aspect of this invention, a layered presentation system comprises a shared display; and a server configured to receive image data in a compressed domain form from each of a plurality of external sources each of which is in communication with the server. The server is further configured to compute a composite image in the compressed domain based on the compressed domain image data received from multiple external sources, to decode the composite image, and to render the composite image on the shared display. In accordance with this aspect of the invention, all data exchange between the server and the external sources is in the compressed domain.

The computing of the composite image in the compressed domain is preferably accomplished by performing one or more of the following operations: blending select received image data, and overlaying select received image data.

The plurality of external sources may be a plurality of clients, one of which is the master client. In that case, one of the multiple sets of compressed domain data received by the server and used to compute the composite image represents a master image received from the master client and each of the other sets of compressed domain data received by the server and used to compute the composite image represent secondary imagery received from one or more of the other clients.

Preferably, the server is configured to compute the composite image by scaling the master image as required, scaling any secondary imagery as required, and determining how and where to incorporate each secondary imagery onto the master image and so incorporating each secondary imagery onto the master image.

Preferably, the server is further configured to incorporate each secondary imagery onto the master image by $\alpha$ blending the master image and that secondary imagery and determining proper placement of that secondary imagery with respect to the master image. The $\alpha$ blending and the placement operation may be combined. Also, the $\alpha$ blending and the placement operation for a particular secondary imagery may be specified by the client from which that secondary imagery originated.

Preferably, the server is configured to store the master image and each secondary imagery received in compressed domain form, but does not store the composite image. Additionally, the server is preferably configured to compute the composite image on-the-fly in the compressed domain.

Preferably, each of the master image and each secondary imagery received by the server has a unique identification comprising a session identification identifying a particular presentation session during which it is received, a client identification identifying the particular client from which it originated, and an image identification. The unique identification may be used to co-identify multiple packets of data containing parts of the same master image or secondary imagery.

The shared display and the server may be embodied in a single display-capable device which may be an LCD projector.

In accordance with another aspect of the invention, a layered presentation system comprises a shared display; a plurality of clients, each of which comprises a display; and a server configured to receive data in a compressed domain form from each of the plurality of clients. The server is further configured to compute a composite image in the compressed domain based on multiple sets of compressed domain data received from multiple clients, decode the composite image, and render the composite image on the shared display. According to this inventive aspect, each client is configured to request that the server send that client a copy of a current display scaled to match that client's display, the current display being a rendering of a master image or a computed composite image, the server being further configured to scale the copy of the current display in accordance with the request. Also, all data exchange between the server and the clients is in the compressed domain.

Preferably, one of the plurality of clients is a master client, one of the multiple sets of compressed domain data received by the server and used to compute the composite image represents the master image received from the master client, and each of the other sets of compressed domain data received by the server and used to compute the composite image represent secondary imagery received from one or more of the other clients.

Preferably, each client includes at least one input device, e.g., a pen, a mouse, and/or a brush, with which to generate the secondary imagery transmitted to the server, the secondary imagery being generated during a presentation as annotation to the current display. The pen, mouse or brush can be used on any client that has an appropriate touch-screen.

According to another aspect, a method of maintaining and processing image data received from multiple sources to form a composite image comprised of image data from each of the multiple sources is provided. The method comprises the steps of: receiving a master image; scaling the master image, if necessary, to fit a target display; receiving secondary imagery; scaling received secondary imagery, if necessary; and performing a blending operation between the master image and each received secondary image. In carrying out the method, all images received are in a compressed domain form, and all scaling and blending are done in the compressed domain.

Preferably, the blending operation performing step comprises determining how and where to incorporate each secondary imagery onto the master image and so incorporating each secondary imagery onto the master image.

Preferably, the blending operation performing step comprises α blending the master image and each secondary imagery and determining proper placement of that secondary imagery with respect to the master image. The α blending and the placement may be combined.

In accordance with further aspects of the invention, the above-described method or any of the steps thereof may be embodied in a program of instructions (e.g., software) which may be stored on, or conveyed to, a computer or other processor-controlled device for execution. Alternatively, the method or any of the steps thereof may be implemented using functionally equivalent hardware (e.g., ASIC, digital signal processing circuitry, etc.) or a combination of software and hardware.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A. Conference Scenario with Shared Display

Figure 1:
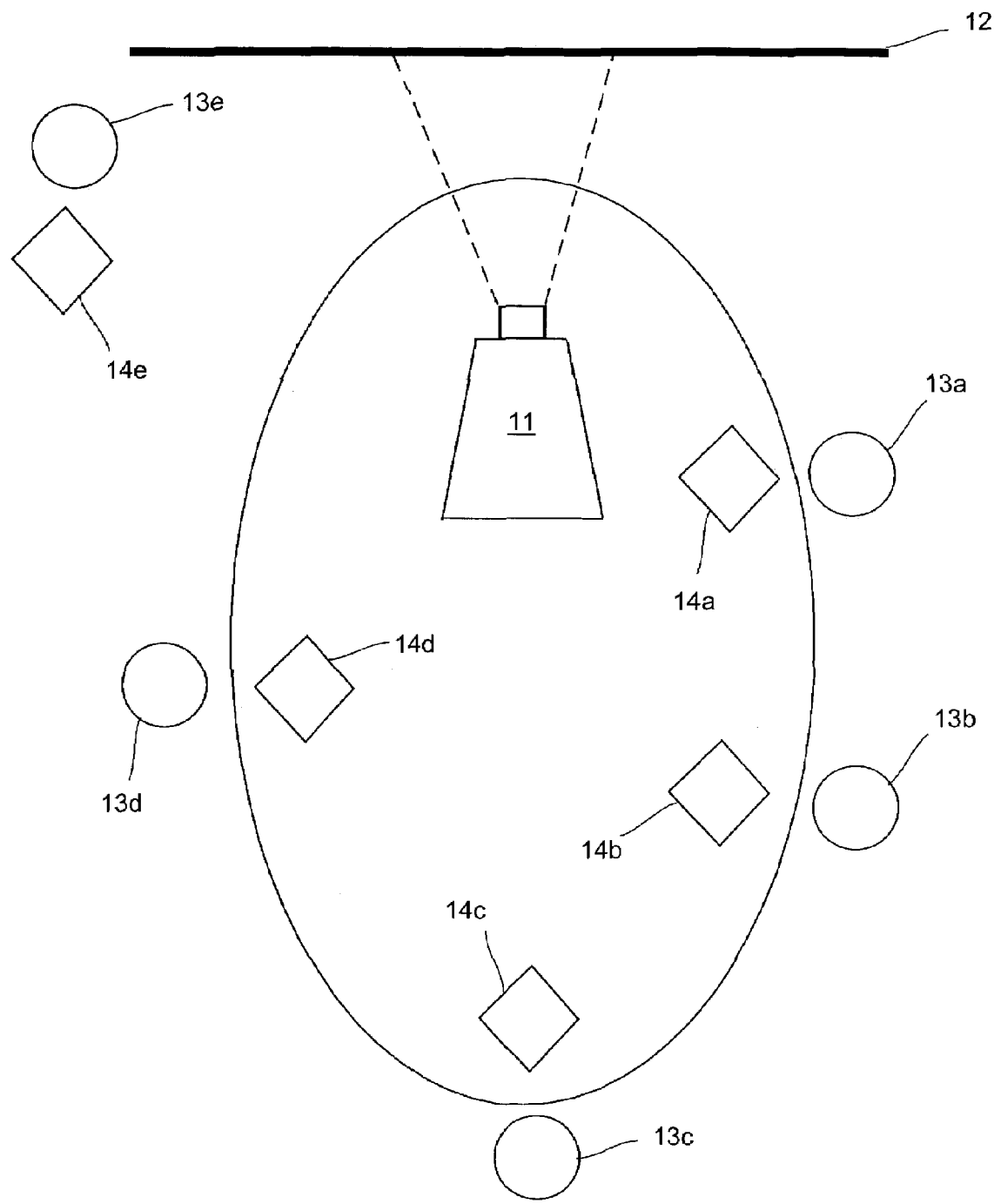
FIG. 1 is a schematic representation of a conference room scenario, representing an environment in which embodiments of the invention may be practiced.

FIG. 1 illustrates a typical conference room setting, where each of multiple participants has the ability to view the current screen contents on his/her own display and/or on a shared display and to add secondary imagery to a master image as desired. As shown in the figure, an LCD projector 11 is displaying on a screen 12 as one of the conference participants 13a makes a presentation. The presenter 13a is in control of a set of master images which typically forms the basis of the presentation. These images may be in the form of "slides" that where created using PowerPoint® or any other presentation software and now reside in the presenter's client device 14a. Other attendees 13b-13e, for example, may participate through their respective client devices 14b-14e. In the illustrated example of FIG. 1, the presenter 13 and three additional attendees 13b-13d are shown as physically present in the conference room, while one attendee 13e participates from a remote location. This arrangement is by way of example only. Many other variations are possible regarding the locations of participants, as will be readily understood from the description of the invention.

Figure 2:
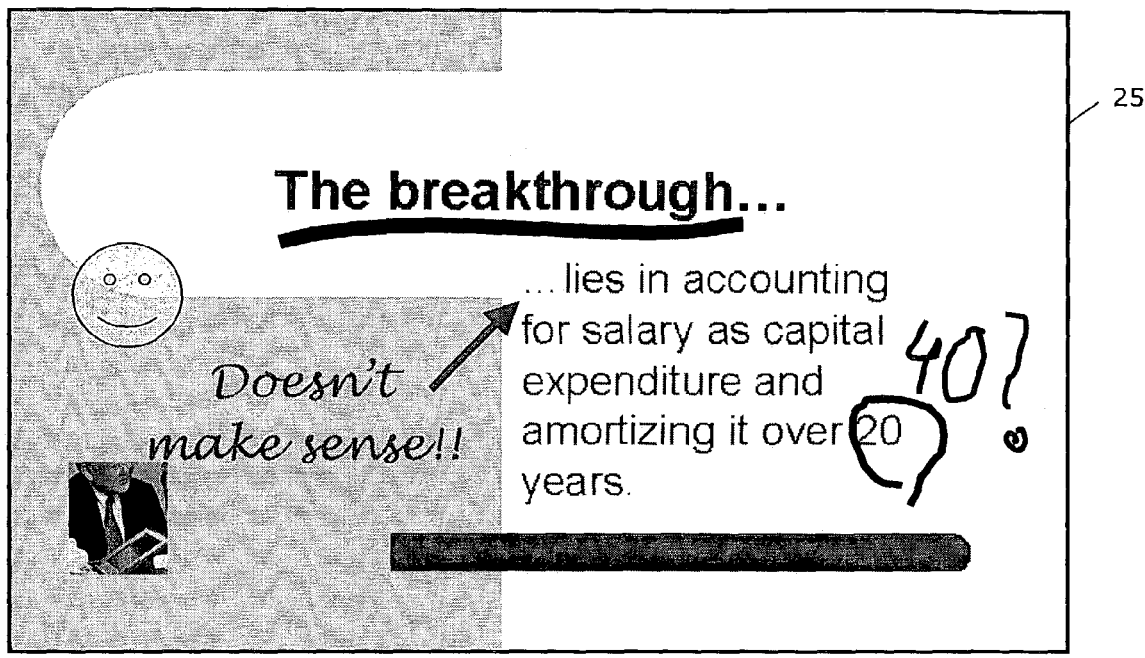
FIG. 2 is an example of a composite image that includes overlaid and blended imagery from a master image and secondary imagery being displayed on a shared display.

The other attendees 13b-13e may participate in the presentation by periodically painting additional imagery/annotations/video (i.e., secondary imagery) to the image currently being displayed on their respective client devices 14b-14e. The presentation system of this invention is able to receive such secondary imagery, process it including scaling it as required, and place the secondary imagery on the original (i.e., master) image as desired. In accordance with the processing features of this invention, this secondary imagery can be blended on to the master image so as to augment but not obscure it, thereby creating an output image 25 with overlaid and blended imagery, as shown in FIG. 2. As can be seen, the output image is a composite of a master image and secondary imagery, the latter of which comprises various annotations including underlying, comments, questions, etc.

The client devices 14a-14e may be any of a variety of types, including personal PCs, laptops and wireless handheld devices such as cell-phones and PDAs, each client device 14 including a display and one or more input devices appropriate for the type of client device. The presentation system of this invention is able to accommodate all such client devices 14. The invention enables such client devices 14, whether remotely located or not, to add secondary imagery to the master image and to view a copy of the current screen contents on their own display (of whatever size) if desired.

B. Overview of LAPE and its Algorithm (Lape)

The present invention provides the features to carry out these functions by way of a layered presentation system utilizing compressed-domain image processing (LAPE) and an underlying algorithm (Lape) that utilizes efficient compressed-domain operations on compressed (preferably JPEG) images. LAPE and its algorithm Lape provide a convenient and efficient way for multiple conference/meeting participants to view, listen and provide input to a presentation by adding secondary imagery to a currently displayed image.

LAPE and its algorithm offer some unique and distinguishing features not available in other prior systems. In this invention, all data exchange is in a compressed-domain format, preferably the JPEG format. Likewise, scaling and alpha-blending, necessitated by the requirement of arranging multiple images on the display, are done in the compressed domain. The composite image (resulting from the placement/blending of secondary imagery onto the master image) is itself not stored. Only the constituent images are stored in their compressed form, in an efficient chained data structure. For display (or transmission at possibly a different scale), the composite image is computed on-the-fly in compressed format and can be fed into a hardware/software decoder. The specific Lape protocol used in the system is also unique.

C. LAPE Architecture

Figure 3:
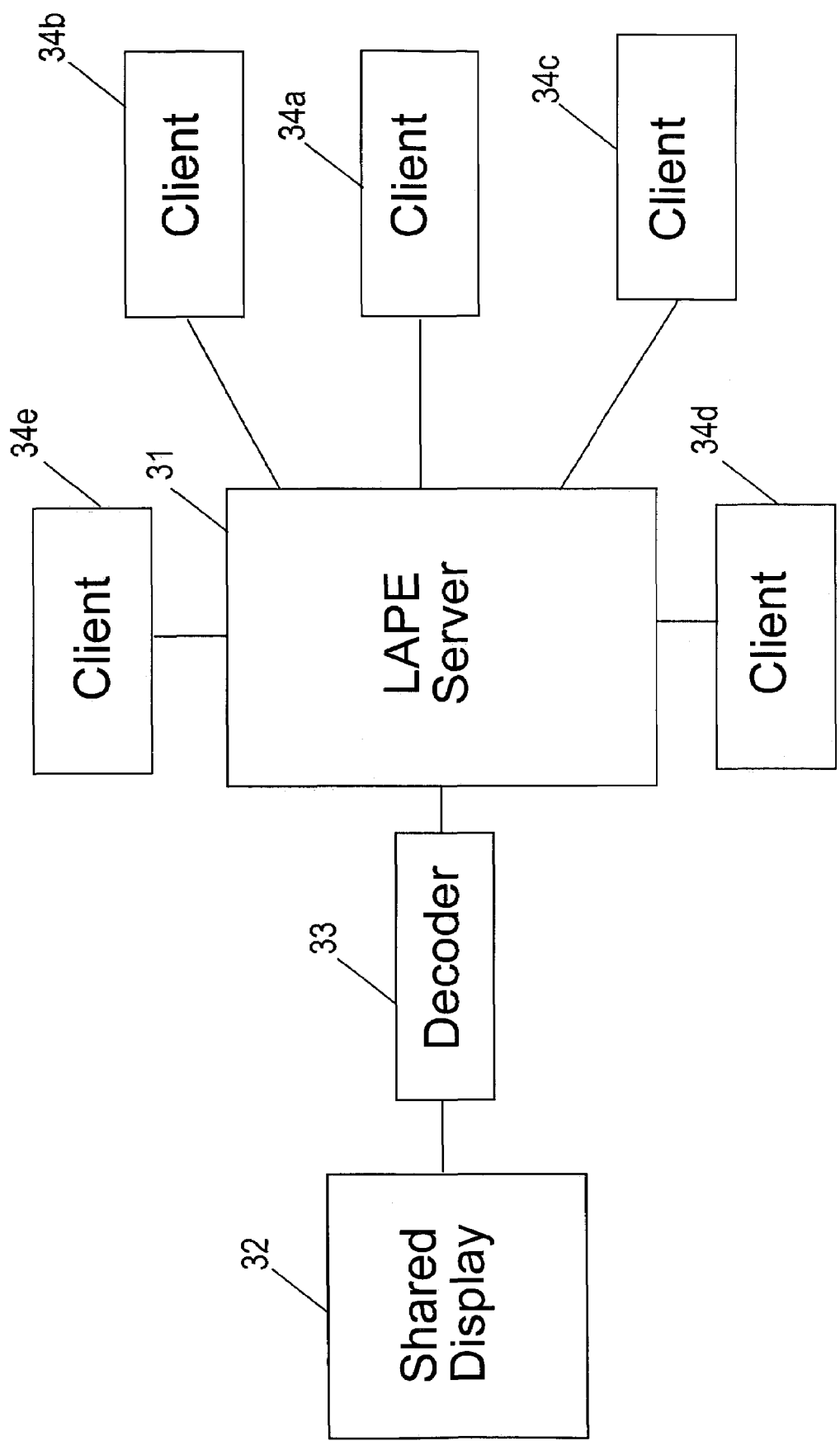
FIG. 3 is a block diagram illustrating the architecture of the layered presentation system according to embodiments of the invention.
Figure 5:
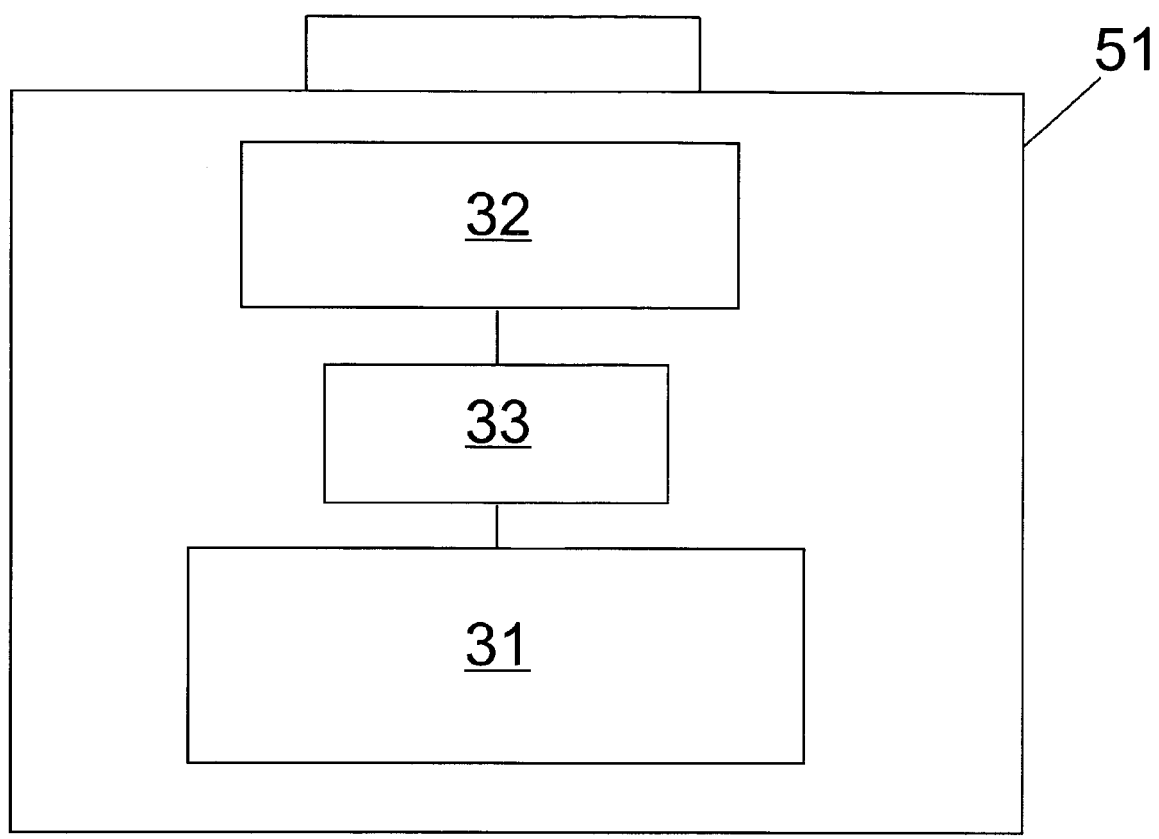
FIG. 5 is a schematic view of an LCD projector having modules of the invention included therein.

Referring now to FIG. 3, the LAPE system comprises a main unit 31, referred to in the figure as a LAPE server, in wired or wireless communication with a shared display 32 via a decoder 33, preferably configured to decode JPEG images. The LAPE server 31 can be implemented in hardware, software or combination thereof, and is part of a network which also includes LAPE clients 34a-34e participating in the presentation. Each LAPE client 34a-34e resides on a respective one of the client devices 14a-14e which is in either wired or wireless communication with the server 31. The LAPE server 31 produces compressed images (preferably in JPEG format) that are to be decoded by the decoder 33 and painted on the shared display 32. The decoding of the compressed images for the purpose of display can be done either in software or using relatively inexpensive hardware. In FIG. 3, the LAPE server 31, the decoder 33, and the shared display 32 are shown as separate modules. However, these modules can also be bundled together inside a single unit, for example an LCD projector 51, as shown in FIG. 5.

Each LAPE client 34 provides functionality embodied on its respective client device 14 to enable its user to participate in the presentation as described herein. As previously noted with respect to the client devices themselves shown in FIG. 1, the five LAPE clients 34 shown in FIG. 3 are for purposes of illustration and example only. The system can accommodate any number of LAPE clients 34. The functions of each LAPE client 34 can be implemented in software residing on its host (client) device 14 (e.g., PC, laptop, PDA, cell phone, etc.), while partially exploiting hardware resources on its host and/or on LAPE server 31.

Figure 6:
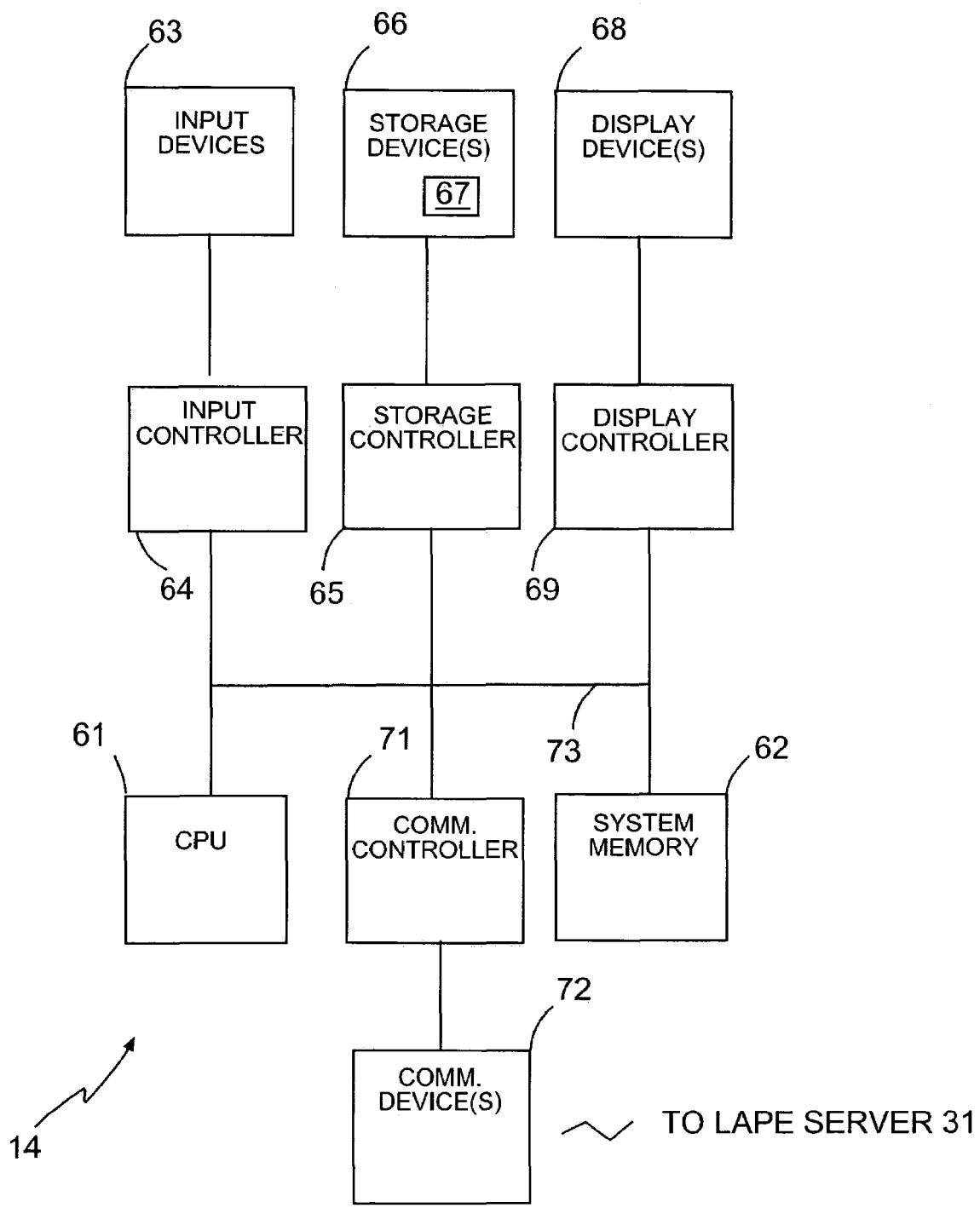
FIG. 6 is a block diagram of major components of an exemplary client device that may be used in connection with embodiments of the present invention.

Such host hardware resources typically include, as shown in FIG. 6, a central processing unit (CPU) 61 that provides computing resources and controls the host 14. CPU 61 may be implemented with a microprocessor or the like, and may also include a floating point coprocessor for mathematical computations. CPU 61 is also preferably configured to process graphics/image data, video and audio processor. Host 14 further includes system memory 62 which may be in the form of random-access memory (RAM) and read-only memory (ROM).

Each host 14 includes one or more input devices 63, e.g., keyboard/keypad, pen, mouse, trackball, and/or brush, etc., to enable its user to participate in the conference by adding secondary image data to a master image shown on the shared display 32. The input device(s) 63 available on any particular host will, of course, vary depending on the particular type of host. For hosts equipped with a touch-screen, the added imagery may be generated using pen, mouse or brush strokes on the touch-screen. Input controller 64 represents an interface to the input device(s) 63.

Each host 14 also typically includes a storage controller 65 that interfaces with one or more storage devices 66 each of which includes a storage medium 67 such as magnetic tape or disk, or an optical medium that may be used to store programs of instructions for operating systems, utilities and applications which may implement various aspects of the present invention. Storage device(s) 66 may also be used to store data received or processed during a conference.

Preferably, each host 14 also includes its own display 68 whose size and type will vary depending on the particular type of host with which it is associated. The display 68 may be of any known type that is suitable for the particular host. A display controller 69 provides an interface to the display 68.

Each host 14 also preferably includes a communications controller 71 that interfaces with a communication device 72 which enables that host to communicate and exchange data with the LAPE server 31. This communication can be through any of a variety of networks including the Internet, a local area network (LAN), a wide area network (WAN), or through any suitable electromagnetic carrier signals including infrared signals. In accordance with embodiments of the inventions, it will be understood that many different arrangements are possible concerning the locations of the host devices 14 on which respective clients 34 run and the location of the LAPE server 31 and shared display 32. These components may or may not be in physical proximity to one another.

In the illustrated host architecture, all major system components connect to bus 73 which may represent more than one physical bus.

The LAPE server 31 may reside within an LCD projector 51, in which case the LAPE server's functions are typically implemented in software that is able to exploit the resources (CPU, system memory, etc.) of the projector. Further details regarding the functionality of LAPE server 31 and LAPE clients 34 are described below.

D. Lape Algorithms

At any point during the conference/presentation, one of the LAPE clients (e.g., client 34a) serves the role of the master client. The master is the primary owner of the shared display 32. Typically, the current presenter's computer (e.g., 14a) will be the master client. Correspondingly, there is a master image that serves as the "background" layer on the display 32. The master image sent by the master client 34 may need to be scaled to fit the display 32. Additionally, each client 34 (including the master client) may have supplied one or more images (secondary imagery) to be placed on top of the master image. Such secondary imagery may also require scaling for proper placement as desired by the client. Further, some of the secondary imagery may need to be overlaid, while others may need to be blended.

In Lape, all imagery (master images and secondary imagery) is preferably maintained and transmitted in the well-known JPEG format. While the compression advantage of this choice is apparent, a key benefit here is that Lape performs all image operations efficiently using compressed-domain processing. With that in mind, it should be noted that, while JPEG is the preferred compressed format in which to maintain and process all image data, the invention is not so limited. With some suitable alterations, which would be apparent to one skilled in the art in light of this disclosure, all image data may be maintained and processed in other image compression formats that employ an orthogonal transform function.

Figure 4:
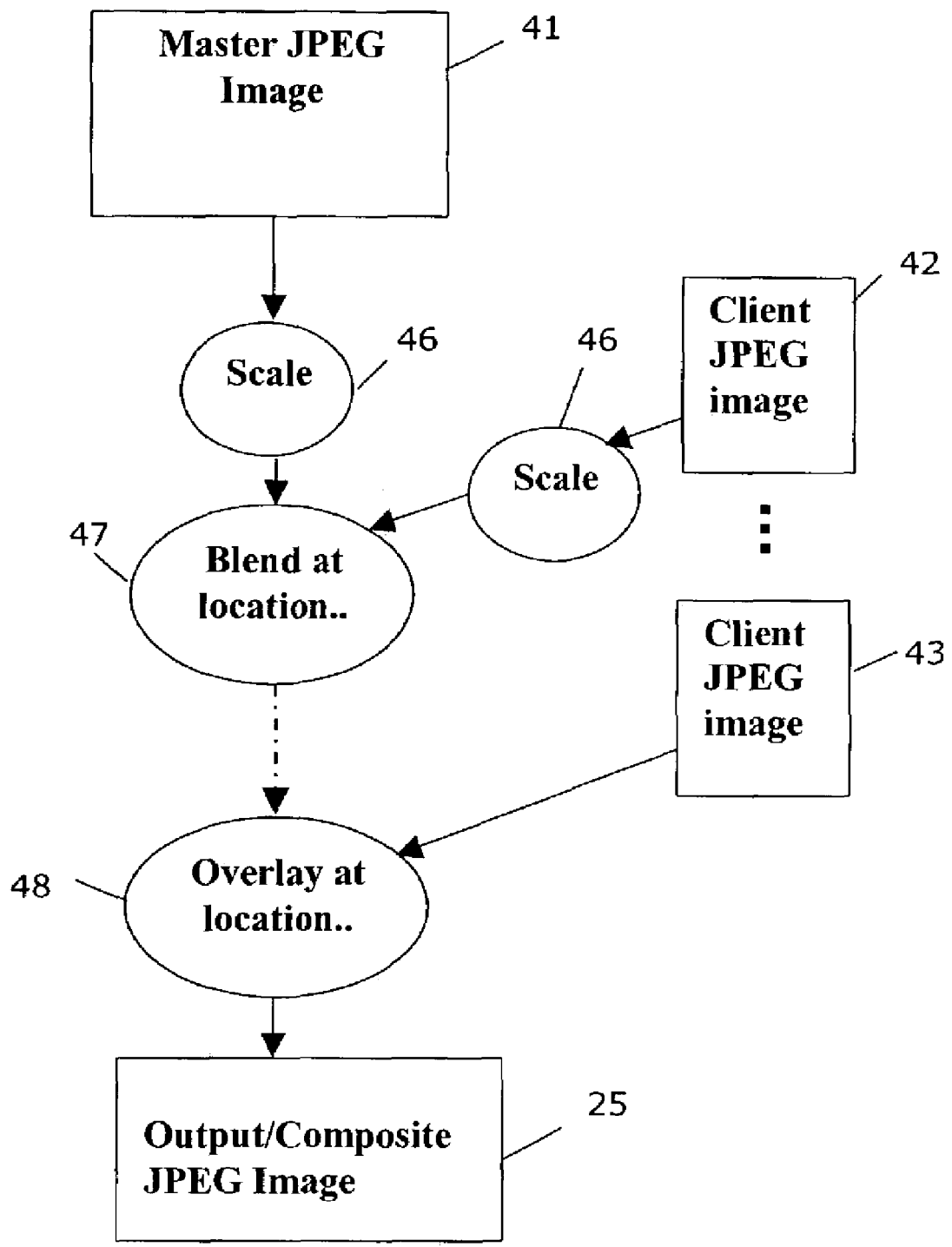
FIG. 4 is a diagram illustrating the structure in which the various images are maintained and used to create a composite image for display.

Thus, at any point, the LAPE server 31 maintains the master image 41 along with all secondary imagery, that is, additional client images 42 and 43, in a structure resembling that shown in FIG. 4. As the figure illustrates, all of the images (i.e., the master image and all client images) are held in a compressed (e.g., JPEG) format, and the composite image 25 is generated in compressed form using only compressed-domain operations.

In addition to scaling 46 (and sharpening if needed) in the compressed-domain, Lape also employs an operation of alpha blending 47. Given images $I_1$ and $I_2$, the alpha-blending operations (in terms of parameter $\alpha$, with $0 \leq \alpha \leq 1$) is the image I each of whose pixels is defined as $(1-\alpha)I_1(x,y)+\alpha I_2(x,y)$. Note that $\alpha=1$ gives an overlay of $I_2$ over $I_1$ and $\alpha<1$ gives a blend.

With JPEG images, alpha blending 47 can be easily implemented in the compressed-domain by operating on Discrete Cosine Transform (DCT) coefficients. Since the DCT is a linear transformation, it follows that for any 8×8 pixel blocks $f_1$, $f_2$ and corresponding blocks $F_1$, $F_2$ of DCT coefficients, $$DCT((1-\alpha)f_1+\alpha f_2)=(1-\alpha)F_1+\alpha F_2$$

Thus, we can do the alpha blending 47 in the compressed-domain. Moreover, we can utilize the sparseness of JPEG DCT coefficient blocks and its compact zig-zag representation: Given compact zig-zag representations of $F_1$, $F_2$ consisting only of non-zero coefficients, we can generate the compact zig-zag representation of $(1-\alpha)F_1+\alpha F_2$ using only $N_1+N_2$ operations, where $N_1$, $N_2$ respectively are the number of non-zero entries in $F_1$, $F_2$. In typical sparse $F_1$, $F_2$ cases, $N_1+N_2$ is likely to be much smaller than 64 and hence represents tremendous efficiency gains.

Assuming identical quantization matrices for the two JPEG images, let the two blocks $F_1$ and $F_2$ of quantized DCT coefficients be stored in compact form in the structure described in the following psuedo code:

```
struct JpegBlock {
    int D; /* the quantized DC coefficient */
    int N; /* number of non-zero AC coefficients */
    struct {
        int Z; /* the zig-zag index */
        int V; /* the value of the coefficient */
    } A[63];
};
```

In this data structure, N is the number of non-zero AC coefficients in the block. Only the first N entries of the array A are meaningful. The element A[k] gives the zig-zag location (Z), and the value (V) for the $k^{th}$ non-zero AC coefficient, $0 \leq k < N$. Reading a block from a JPEG bit-stream into this structure, and writing this structure as JPEG data, are both straightforward, and therefore the details are omitted here.

Then the blending to obtain $F=(1-\alpha)F_1+\alpha F_2$ can be done in $F_1.N+F_2.N$ steps, as follows:

```
F.D = (1-α) F₁.D + αF₂.D
F.N = 0
K1 = 0; K2 = 0; K = 0;
While (K1 < F₁.N and K2 < F₂.N) {
    If (F₁.A[k₁].Z < F₂.A[k₂].Z) {
        F.A[k].Z = F₁.A[k₁].Z
```

-continued

```
        F.A[k].V = (1-α) F₁.A[k₁].V
        K1++
    } else if (F₁.A[k₁].Z > F₂.A[k₂].Z) {
        F.A[k].Z = F₂.A[k₂].Z
        F.A[k].V = α F₂.A[k₂].V
        K2++
    } else {
        F.A[k].Z = F₁.A[k₁].Z
        F.A[k].V = (1-α) F₁.A[k₁].V + α F₂.A[k₂].V
        K1++
        K2++
    }
    K++
}
/* one of F₁/F₂ may have some remaining coefficients, put those into F */
While (K1 < F₁.N) {
    F.A[k].Z = F₁.A[k₁].Z
    F.A[k].V = (1-α) F₁.A[k₁].V
    K1++
    K++
}
While (K2 < F₂.N) {
    F.A[k].Z = F₂.A[k₂].Z
    F.A[k].V = α F₂.A[k₂].V
    K2++
    K++
}
F.N = K
```

If the images use different quantization matrices (in the preferred embodiment, all Lape clients would use identical quantization matrices), then it is straightforward to first dequantize $F_1$ and $F_2$ separately, then apply the above blending algorithm, and then quantize the resulting coefficients.

The alpha blending 47 and the placement 48 can be combined very simply. If the image $I_2$ has to be blended into image $I_1$ starting at top-left coordinate (X,Y) (w.r.t. $I_1$), then the DCT blocks of the output image are obtained by retrieving the DCT blocks of $I_1$ alone in areas where there is no overlap, and blending blocks from $I_1$ and $I_2$ as described above in areas of overlap.

The LAPE server 31 also serves out scaled-down versions of the composite image to any client 34 that requests it (i.e., scaling the composite image down to the client's display size). Again, that scaling is done efficiently using compressed-domain operations.

E. Lape Protocol

Each JPEG image, and indeed each request/response in Lape, is transmitted in one or more UDP packets. Each client 34 in a presentation is assigned a unique id (its network address, typically) by the LAPE server 31. Each Lape presentation has a unique id generated by the server 31. Additionally, each generated image has a unique id (unique for the generating client). The trio of (session-id, client-id, image-id) uniquely determines a single image, and is used to co-identify multiple packets containing parts of a single image.

Any client 34 can send master images, but only one client can be the master at any particular time. If it is contemplated that more than one client may become the master during a given presentation, a suitable sub-protocol may be used to determine which client is allowed to become the master and when. Clients (including the master) 34 can send additional images (secondary imagery), preferably along with specifications for scaling/placement/blending. Often, a participant will generate secondary imagery by sketching an annotation on the display of his/her own client. The client 34 then converts that annotation into JPEG format and sends it to the server 31.

Each participant/attendee may request, through his/her client, that the server 31 provide a copy of the current display scaled down to the client's display size. Additionally, the server 31 may periodically broadcast/multicast (if UDP multicast is supported by the network) the current display scaled down to typical sizes, to reduce network traffic.

F. Effects

As the foregoing description demonstrates, the present invention provides a system (LAPE) and algorithm (Lape) which together provide a convenient and effective way in which to implement a conference or business meeting. The LAPE server, the decoder and the shared display may reside in an LCD projector which is used to give the presentation while each of the LAPE clients reside on respective client devices controlled by respective participants at the conference. The LAPE server and each of the LAPE clients can be implemented in software, hardware, or in a combination thereof where function-specifying software resides on a server/client device and cooperates with the device's resources to enable the variety of actions envisioned by the invention. Some or all of such functions may alternatively be implemented with hardware components including application specific integrated circuits ASICs, digital signal processing circuitry, or the like.

With these implementation alternatives in mind, it is to be understood that the figures and accompanying description provide the functional information one skilled in the art would require to write program code (i.e., software) or to fabricate circuits (i.e., hardware) to perform the processing required. Accordingly, the claim language "machine-readable medium" includes any such medium on which software may be stored or conveyed, as well as any such hardware medium having a program of instructions hardwired thereon.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A layered presentation system, comprising:
    a shared display; and
    a server configured to receive image data in a compressed domain form from each of a plurality of external sources each of which is in communication with the server;
    wherein the server is further configured to
       compute a composite image in the compressed domain based on the compressed domain image data received from multiple external sources by performing one or more of the following operations:
          blending select received image data, and
          overlaying select received image data,
       decode the composite image, and
       render the composite image on the shared display; and
    wherein all data exchange between the server and the external sources is in the compressed domain.

2. A layered presentation system, comprising:
    a shared display; and
    a server configured to receive data in a compressed domain form from each of a plurality of clients, one of which is a master client and each of which is in communication with the server;
    wherein the server is further configured to
       compute a composite image in the compressed domain based on multiple sets of compressed domain data received from multiple clients,
       decode the composite image, and
       render the composite image on the shared display; and
    wherein all data exchange between the server and the clients is in the compressed domain.

3. A layered presentation system as recited in claim 2, wherein one of the multiple sets of compressed domain data received by the server and used to compute the composite image represents a master image received from the master client and each of the other sets of compressed domain data received by the server and used to compute the composite image represent secondary imagery received from one or more of the other clients.

4. A layered presentation system as recited in claim 3, wherein the server is configured to compute the composite image by
    scaling the master image as required,
    scaling any secondary imagery as required, and
    determining how and where to incorporate each secondary imagery onto the master image and so incorporating each secondary imagery onto the master image.

5. A layered presentation system as recited in claim 4, wherein the server is configured to incorporate each secondary imagery onto the master image by $\alpha$ blending the master image and that secondary imagery and determining proper placement of that secondary imagery with respect to the master image.

6. A layered presentation system as recited in claim 5, where the $\alpha$ blending and the placement operation are combined.

7. A layered presentation system as recited in claim 6, wherein the $\alpha$ blending and the placement operation for a particular secondary imagery is specified by the client from which that secondary imagery originated.

8. A layered presentation system as recited in claim 3, wherein the server is configured to store the master image and each secondary imagery received in compressed domain form, but does not store the composite image.

9. A layered presentation system as recited in claim 2, wherein the server is configured to compute the composite image on-the-fly in the compressed domain.

10. A layered presentation system as recited in claim 9, wherein the unique identification is used to co-identify multiple packets of data containing parts of the same master image or secondary imagery.

11. A layered presentation system as recited in claim 2, wherein each of the master image and each secondary imagery received by the server has a unique identification comprising
    a session identification identifying a particular presentation session during which it is received,
    a client identification identifying the particular client from which it originated, and
    an image identification.

12. A layered presentation system as recited in claim 2, wherein the shared display and the server are embodied in a single display-capable device.

13. A layered presentation system as recited in claim 12, wherein, the single display-capable device comprises an LCD projector.

14. A layered presentation system, comprising:
    a shared display;
    a plurality of clients, each of which comprises a display; and a server configured to receive data in a compressed domain form from each of the plurality of clients;

wherein the server is further configured to compute a composite image in the compressed domain based on multiple sets of compressed domain data received from multiple clients, decode the composite image, and render the composite image on the shared display;

wherein each client is configured to request that the server send that client a copy of a current display scaled to match that client's display, the current display being a rendering of a master image or a computed composite image, the server being further configured to scale the copy of the current display in accordance with the request; and wherein all data exchange between the server and the clients is in the compressed domain.

15. A layered presentation system as recited in claim 14, wherein one of the plurality of clients is a master client, one of the multiple sets of compressed domain data received by the server and used to compute the composite image represents the master image received from the master client, and each of the other sets of compressed domain data received by the server and used to compute the composite image represent secondary imagery received from one or more of the other clients.

16. A layered presentation system as recited in claim 15, wherein each client includes at least one input device with which to generate the secondary imagery transmitted to the server, the secondary imagery being generated during a presentation as annotation to the current display, the at least one input device comprising one or more of a pen, a mouse, and a brush.

17. A layered presentation system as recited in claim 16, wherein at least one of the client displays comprises a touch-screen on which pen, mouse or brush strokes can be made.

18. A method of maintaining and processing image data received from multiple sources to, form a composite image comprised of image data from each of the multiple sources, the method comprising the steps of:

receiving a master image;

scaling the master image, if necessary, to fit a target display;

receiving secondary imagery;

scaling received secondary imagery, if necessary; and performing a blending operation between the master image and each received secondary image;

wherein all images received are in a compressed domain form, and wherein all scaling and blending are done in the compressed domain.

19. A method as recited in claim 18, wherein the blending operation performing step comprises determining how and where to incorporate each secondary imagery onto the master image and so incorporating each secondary imagery onto the master image.

20. A method as recited in claim 18, wherein the blending operation performing step comprises $\alpha$ blending the master image and each secondary imagery and determining proper placement of that secondary imagery with respect to the master image.

21. A method as recited in claim 20, wherein the $\alpha$ blending and the placement are combined.

22. A machine-readable medium embodying a program of instructions for directing a machine to maintain and process image data received from multiple sources to form a composite image comprised of image data from each of the multiple sources, the program of instructions comprising:

instructions for scaling a received master image, if necessary, to fit a target display;

instructions for scaling received secondary imagery, if necessary; and instructions for performing a blending operation between the master image and each received secondary image;

wherein all images received are in a compressed domain form, and wherein all scaling and blending are done in the compressed domain.

23. A machine-readable medium as recited in claim 22, wherein the blending operation performing instructions comprises instructions for determining how and where to incorporate; each secondary imagery onto the master image and so incorporating each secondary imagery onto the master image.

24. A machine-readable medium as recited in claim 22, wherein the blending operation performing instructions comprises instructions for $\alpha$ blending the master image and each secondary imagery and determining proper placement of that secondary imagery with respect to the master image.

25. A machine-readable medium as recited in claim 24, wherein the $\alpha$ blending and the placement are combined.

\* \* \* \* \*